United States Patent [19]
Drechsel et al.

[11] 4,105,748
[45] Aug. 8, 1978

[54] METHOD OF PRODUCING PHOSPHORIC ACID AND POTASSIUM DIHYDROGEN PHOSPHATE FROM PHOSPHATE ROCK IN THE SUBSTANTIAL ABSENCE OF FLUORINE EVOLUTION

[75] Inventors: Erhart Karl Drechsel, Houston, Tex.; John B. Sardisco, Shreveport, La.

[73] Assignee: Pennzoil Company, Shreveport, La.

[21] Appl. No.: 785,772

[22] Filed: Apr. 7, 1977

Related U.S. Application Data

[62] Division of Ser. No. 696,290, Jun. 15, 1976, Pat. No. 4,055,626.

[51] Int. Cl.² .............................................. C01B 25/16
[52] U.S. Cl. .................................. 423/320; 423/309; 423/321 R; 71/34
[58] Field of Search .................. 423/167, 320, 321 R, 423/309, 312, 313, 241; 71/34

[56] References Cited

U.S. PATENT DOCUMENTS

| Re. 29,458 | 10/1977 | Drechsel et al. ..................... 423/313 |
| 3,567,376 | 3/1971 | Satterwhite et al. ................. 423/320 |
| 3,697,246 | 10/1972 | Drechsel et al. ........................ 71/34 |
| 3,803,884 | 4/1974 | Thompson ............................ 423/313 |
| 3,840,639 | 10/1974 | Drechsel ............................. 423/167 |
| 3,949,047 | 4/1973 | Cherdon et al. ................. 423/321 R |
| 3,956,464 | 5/1976 | Drechsel et al. ..................... 423/312 |
| 4,055,626 | 10/1977 | Drechsel et al. ..................... 423/320 |
| 4,060,586 | 11/1977 | Sardisco et al. ..................... 423/320 |

FOREIGN PATENT DOCUMENTS 1,263,692  2/1972  United Kingdom .................... 423/320

*Primary Examiner*—O. R. Vertiz
*Assistant Examiner*—Eugene T. Wheelock
*Attorney, Agent, or Firm*—Lowe, King, Price & Markva

[57] ABSTRACT

Substantially fluoride-free phosphoric acid is produced by the acidulation of phosphate rock with sulfuric acid wherein the acidulation reaction is conducted in the presence of added potassium as $K_2O$ bearing compounds; e.g. $KHSO_4$, $K_2SO_4$, $KH_2PO_4$ or $KOH$, and additional silica, to precipitate fluorides and silica as potassium silicofluoride and then removed on separation of the gypsum formed. Optionally, additional silica may be added to the phosphoric acid solution recovered after precipitation and removal of the gypsum, to precipitate additional fluoride as potassium silicofluoride to further purify the phosphoric acid. In a further embodiment sufficient potassium may be added along with additional silica in the acidulation step to produce potassium dihydrogen phosphate and phosphoric acid as additional products. The phosphoric acid and potassium dihydrogen phosphate are recovered substantially free from fluoride contamination and the reaction is carried out in the substantial absence of fluorine evolution into the atmosphere. Also disclosed is a process for conducting a conventional phosphoric acid facility to produce phosphoric acid and gypsum wherein defluorination of the phosphoric acid recovered is achieved by silicon dioxide and $K_2O$ addition and the fluorides are removed from the system, the process including steps for production of pure phosphoric acid and potassium dihydrogen phosphate.

7 Claims, 3 Drawing Figures

METHOD OF PRODUCING PHOSPHORIC ACID AND POTASSIUM DIHYDROGEN PHOSPHATE FROM PHOSPHATE ROCK IN THE SUBSTANTIAL ABSENCE OF FLUORINE EVOLUTION

This is a division, of application Ser. No. 696,290, filed June 15, 1976, now U.S. Pat. No. 4,055,626.

BACKGROUND OF THE INVENTION

1. Field of the Invention

This invention relates to the production of fluoride-free phosphoric acid, and optionally substantially fluoride-free potassium dihydrogen phosphate, by the acidulation of phosphate rock with sulfuric acid, and more particularly to a process comprising the acidulation of phosphate rock with sulfuric acid wherein the reaction is conducted in the presence of a controlled amount of potassium ion as $K_2O$ and a controlled amount of silica as $SiO_2$.

2. Description of the Prior Art

Phosphoric acid plants are currently operated utilizing a basic and well known process for the acidulation of phosphate rock which comprises reaction of the rock with sulfuric acid to form phosphoric acid with subsequent reaction of the phosphoric acid with ammonia to produce ammonium phosphates. The phosphoric acid formed in this process is called wet process phosphoric acid. In this reaction, a by-product is gypsum having the chemical formula $CaSO_4.2H_2O$. Essentially, all phosphate rock contains some fluorine normally in the 3.0–4.0 percent range and the acidulation reaction usually generates gaseous fluorides which in prior years was usually evolved into the atmosphere or trapped with water scrubbing apparatus.

In recent years, air and water pollution law regulations have become more stringent and are now being enforced vigorously. Therefore, operators of phosphoric acid plants have had many pollution problems with fluorine emission in the atmosphere and with the by-product gypsum from these phosphoric acid plants. An important problem in the operation of these wet process phosphoric acid plants has been in the expensive methods necessary for handling the large amounts of fluorine compounds liberated in the gaseous and aqueous effluents from such plants. In some phosphate complexes from 10,000 to 30,000 tons per year of fluorine compounds may be liberated by various methods and it is estimated that in a typical wet process phosphoric acid plant, a portion of the fluorides are evolved in the atmosphere in gaseous form such as hydrogen fluoride and silicon tetrafluoride which can destroy vegetation and affect other facilities in close proximity to the plant if they are not scrubbed out, and such scrubbing systems are not always effective. A second portion of the fluorine is found in gypsum ponds and is subject to leaching into groundwater and streams. Still another portion of the fluorine remains with the final products and when such final products are used as fertilizers they may introduce fluorine into the soil. Only in recent years have studies been made on the effects of fluorides contained in final products and indications seem clear that they may have a deleterious effect on the long range producing ability of the soil, see for Example Kudzin et al, Chemical Abstracts, 73, 870534 (1970).

There is a great deal of literature and patent art related to attempts to remove the fluoride values from fluorinecontaining phosphate rock in the operation of a phosphoric acid plant including methods for suppressing the evolution of fluoride values in the operation of a process and/or attempting to scrub the fluorine from effluent gases and waste water. Two such methods are described in U.S. Pat. Nos. 2,954,275 and 2,976,141 to Carothers et al which use sodium or potassium compounds to suppress the fluorides so that they are concentrated in the gypsum cake. These patents indicate that this is achieved by adding a suppressing amount of an alkali metal salt to the acidulation reaction. However, these processes were conducted in the presence of sulfuric acid in the acidulation reactor and the process had incomplete control on fluoride decomposition and evolution during acidulation.

Other prior art has been noted which attempts to overcome the problem of fluorine evolution and a reduction in the amount of fluorine contained in final products. A reference of this type is British Pat. No. 735,086 (1955), which discloses the acidulation of phosphate rock by a two step procedure using a strong mineral acid such as nitric acid or hydrochloric acid. According to this patent, an initial low temperature acidulation at 20°–50° C. is carried out with the addition of an alkali, for example, ammonia or lime, as a precipitating agent in a quantity sufficient to precipitate substantially the whole of the fluorine and other impurities but insufficient to precipitate a substantial amount of calcium phosphates.

In a similar process in U.S. Pat. No. 3,431,096 to Hill et al, a process is disclosed for reducing evolution of fluorine values in formation of triple superphosphate fertilizer by reaction of phosphate rock and phosphoric acid wherein ammonia or urea is added to suppress the fluorine evolution. However, in this patent, there is no provision for removal of the fluorine values from the product and therefore even if the fluorine evolution is prevented, the flourine values will be retained in the resulting product and therefore distributed to the soil when it is used as a fertilizer.

In a series of patents issuing from the mid 1940's to early 1960's there are disclosed processes for the defluorination of phosphate rock and the production of defluorinated calcium phosphates. In these U.S. Pat. Nos. 2,337,498; 2,442,969; 2,893,834; and 2,997,367, the defluorination reaction is carried out by subjecting a mixture of phosphate rock, phosphoric acid and an alkali metal material to calcination, that is by reaction at temperatures as high as 1000° to 2200° C. Obviously, under these conditions the fluorine is going to be rapidly evolved or if not evolved, certainly will remain in the final product, said to be an animal feed.

Two additional patents of pertinence to processes of this type are U.S. Pat. Nos. 2,567,227 and 2,728,635 to Miller which disclose the acidulation of phosphate rock with phosphoric acid to form monocalcium phosphate, cooling to solidify the monocalcium phosphate and then converting it to dicalcium phosphate by hydrolysis. In the earlier patent, it is indicated that the fluorine in the rock is vaporized in the system, circulates throughout the system and/or leaves the system with the calcium phosphate. The later patent indicates that the process of U.S. Pat. No. 2,567,227 provided a final calcium phosphate product having a fluorine content too high to be of animal feed grade. The solution to this problem in the later patent was the addition of some dilute sulfuric acid in the acidulation step which would of course lead to additional fluorine evolution during the first step.

There are also patents known in the art which indicate that it is known to acidulate phosphate rock with phosphoric acid and to then recover solid monocalcium phosphate by cooling of the resulting solution and recovering the monocalcium phosphate. Processes of this type are disclosed for example in U.S. Pat. Nos. 3,494,735 and 3,645,676. In addition, U.S. Pat. Nos. 3,619,136 and 3,792,151 to Case disclose the reaction of phosphate rock with recycle phosphoric acid at temperatures of about 125°–180° F. (52° to 83° C.) to form a solution of monocalcium phosphate, reacting the latter solution with sulfuric acid to produce phosphoric acid and calcium sulfate, precipitating the calcium sulfate, and recycling a portion of the phosphoric acid to the phosphate rock reaction. These patents point out that under the conditions recited, fluorides are not evolved but remain primarily unreacted and may be found with insoluble materials although a portion remains in the phosphoric acid solution product. It is also known to react phosphate rock or a solubilized form with sulfuric acid and $KHSO_4$ in combination with other steps and this reaction is described in U.S. Pat. Nos. 3,697,246 and 3,718,253.

In copending application Ser. No. 608,973, filed Aug. 29, 1975, of one of us, there is disclosed a process for the acidulation of phosphate rock and production of substantial pure alkali metal phosphates, calcium phosphates and phosphoric acid which comprises primarily the steps of acidulating phosphate rock with a phosphoric acid solution containing sufficient alkali metal values to provide potassium ions in the system and thus form an insoluble precipitate comprising a mixture of impurities, silicas and fluorides from which the fluorides can be recovered usable form. It is a feature of this disclosure that the fluorides are not evolved into the atmosphere but are primarily recovered in the insoluble precipitate removed prior to gypsum precipitation. In addition, in prior U.S. Pat. No, 3,840,639 there is disclosed a process for the acidulation of phosphate rock by reaction of the rock with phosphoric acid in the presence of potassium ion.

Of other pertinent art in this area, U.S. Pat. No. 2,114,600 to Larson discloses the reaction of phosphate rock with nitric acid in order to form dicalcium phosphate and calcium nitrate. The patentee points out that in this system difficulties are experienced because the fluorine present in phosphate rock is precipitated as a very slimy calcium fluoride extremely difficult to separate from the nitrate solution and to overcome this problem, the patentee suggests that the phosphate rock be dissolved in the nitric acid in the presence of a fairly large amount of silica while at the same time adding an alkali salt such as alkali nitrate or chloride so that the fluorine reacts with the silica and alkali salt to provide an insoluble well crystalized alkali silicofluoride which can easily be separated from the solution nitrates and phosphoric acid. The patent, however, is limited to the addition of large excesses over the theoretical amount of alkali salt.

A second patent in this area is U.S. Pat. No. 2,865,709 to Horn et al which relates to the production of insoluble silicofluorides wherein phosphate rock is mixed with sulfuric acid and the gas evolved from the system containing silicon tetrafluoride is absorbed in water to form a waste liquor solution containing fluosilicic acid. When this solution is mixed with a chloride such as potassium chloride, insoluble fluosilicates are formed but the silica fluoride develops into a highly dispersed state as an unfilterable gel. This patentee proposes to overcome this problem by adjusting the fluorine to silica mol ratio in the waste liquor so as to have a mol ratio of fluorine to silica of about 4.4:1 before reaction with potassium chloride.

The present invention provides an acidulation system which substantially eliminates the problem of fluorine evolution in the acidulation of fluorine-containing phosphate rock with phosphoric acid and also provides systems wherein substantially pure phosphoric acid is recovered, and the fluoride contained in phosphate rock and phosphoric acid is precipitated as potassium silicofluoride. Therefore, the present invention provides a unique combination of steps and advantages not appreciated heretofore in the prior art as none of these prior references disclose the unique combination of steps and results of this invention.

SUMMARY OF THE INVENTION

It is accordingly one object of the invention to produce relatively pure phosphoric acid and relatively pure alkali metal phosphates which are essentially free of fluorides.

A further object of the invention is to provide a procedure for the acidulation of phosphate rock with sulfuric acid wherein the fluorides are caused to be precipitated and primarily recovered in combination with the gypsum.

A still further object of the invention is to provide a system for the acidulation of phosphate rock with sulfuric acid wherein the reaction is carried out in the presence of potassium ion and silica.

A still further object of the invention is to provide a method for the acidulation of phosphate rock with sulfuric acid wherein the reaction is conducted in the presence of controlled amounts of potassium ion and silica for the recovery of highly pure phosphoric acid and alternatively the preparation of substantially pure potassium dihydrogen phosphate and phosphoric acid.

A still further object of the present invention is to provide a method for conducting the acidulation of phosphate rock with sulfuric acid with hydrogen fluoride evolution wherein the wet process phosphoric acid recovered is subsequently subjected to defluorination to provide pure feed grade phosphoric acid and optionally, potassium dihydrogen phosphate product.

Other objects and advantages of the present invention will become apparent as the description thereof proceeds.

In satisfaction of the foregoing objects and advantages there is provides by this invention a method for the acidulation of phosphate rock for the production of phosphoric acid which comprises contacting phosphate rock with a sufficient amount of sulfuric acid to effect acidulation wherein the reaction is conducted in the presence of sufficient potassium ion that the resulting phosphoric acid filtrate contains about 0.5 to 1.0 weight percent $K_2O$, and in the presence of a controlled amount of silica in the acidulation system, conducting the acidulation until the precipitation of gypsum is complete, removing the gypsum containing therein fluoride as potassium silicofluoride and recovering a solution of phosphoric acid. Also provided are optional embodiments including the presence of a sufficient amount of potassium ion in the acidulation stage to produce potassium dihydrogen phosphate and phosphoric acid as well as a continuous system wherein the amount of potassium ion and silica required for the acidulation reaction are provided by recycle of a stream containing $K_2O$ and $SiO_2$ with phosphoric acid. A further optional embodiment is the addition of further silicon dioxide to the phosphoric acid solution to cause the precipitation of any remaining fluoride in the phosphoric acid as potassium silicofluoride to provide a feed grade phosphoric acid.

Also provided by this invention in a further optional embodiment is a process for conducting a conventional phosphoric acid facility involving the reaction of phosphate rock and sulfuric acid to form gypsum and phosphoric acid wherein the hydrogen fluorides are evolved and trapped in a scrubbing system, the gypsum precipitate is removed, and the resulting wet process phosphoric acid is subjected to defluorination by reaction with a silicon dioxide-containing material and $K_2O$-containing material in order to precipitate fluorides remaining in the phosphoric acid as potassium silicofluoride, removing the potassium silicofluoride and any additional gypsum from the phosphoric acid and treating for recovery of the fluorides by reaction with calcium hydroxide, recovering at least a portion of the phosphoric acid as substantially pure phosphoric acid and reacting the remainder of the phosphoric acid with phosphate rock and potassium hydrogen sulfate or potassium sulfate to produce potassium dihydrogen phosphate and gypsum. In one embodiment of this aspect, the potassium dihydrogen phosphate may be recovered, and the remaining mixture of phosphoric acid, potassium dihydrogen phosphate, gypsum and any remaining fluorides recycled to the defluorination step. In a separate and preferred embodiment, the precipitated gypsum and fluorides as $K_2SiF_6$ are removed to provide a solution having a certain $P_2O_5/K_2O$ content, a portion of the latter solution is removed and the remainder is recycled to the defluorination step.

BRIEF DESCRIPTION OF THE DRAWINGS

Reference is now made to the drawing accompanying this application wherein.

DESCRIPTION OF THE PREFERRED EMBODIMENTS

Figure 1:
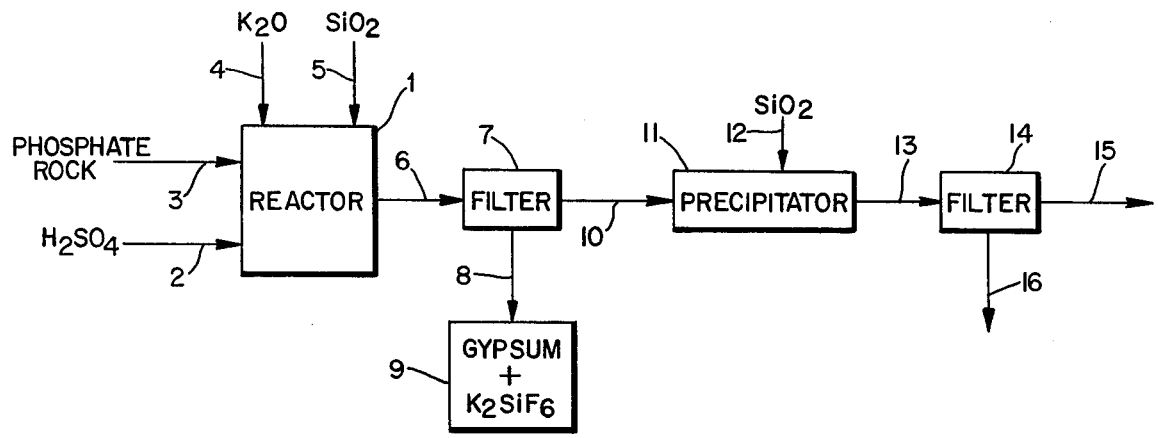
FIG. 1 represents a schematic outline of the main embodiment of the present invention.

As indicated above, in a main embodiment, this invention is concerned with a method for conducting the acidulation of phosphate rock with sulfuric acid or mixtures of sulfuric acid and phosphoric acid, wherein the fluoride present in the rock is substantially prevented from evolving during the reaction and thus contaminating the atmosphere, and also is prevented from any significant presence in the final products. According to the present invention, it has been discovered that in order to conduct the acidulation of phosphate rock with sulfuric acid in the substantial absence of fluorine evolution, and in the substantial absence of fluoride contamination of final products, that it is necessary to add controlled amounts of potassium ion as well as controlled amounts of silica as silicon dioxide in order to insure complete reaction of the fluoride contained in the rock with the potassium and silicon and also to insure that the resulting product will precipitate during the reaction and can thus be removed with the gypsum by-product. The present invention provides a procedure for conducting this reaction and also provides procedures including continuous reactions whereby the acidulation reaction may be conducted utilizing a recycle stream to provide the necessary additional potassium and silica requirements. Further, the continuous reaction also provides good conversions to provide substantially pure products such as phosphoric acid and potassium dihydrogen phosphate.

In accordance with a main feature of the present invention, sulfuric acid and phosphate rock are reacted at temperatures ranging from 50°–90° C. with sufficient sulfuric acid being present to theoretically completely acidulate the phosphate rock. The reaction is conducted at a temperature of about 50°–90° C., preferably 60° to 75° C. for a time sufficient to achieve substantially complete acidulation and adequate gypsum crystal growth. It has been found that a reaction period of about three to twelve hours is sufficient.

In order to suppress fluorine evolution and effect precipitation of the fluorine as potassium silicofluoride in conducting this process, there is maintained in the acidulation reactor an amount of $K_2O$ as potassium ion in order to supply the amount necessary to combine with the available fluoride. Generally, it is preferred in this invention that the amount of potassium ion present in the mixture should be a sufficient amount over and above the amount of potassium theoretically necessary to combine with the fluorine contained in the phosphate rock to provide a $K_2O$ concentration of about 0.5 to 1.0 weight percent in the resulting phosphoric acid filtrate. The potassium ion may be provided as $K_2O$ by the addition to the mixture of $KOH$, $KH_2PO_4$, $KHSO_4$, $K_2SO_4$, mixtures thereof, and the like. Recycle of $K_2O$ as $KH_2PO_4$ is especially preferred.

In this initial reaction the sulfuric acid acts on the rock to form phosphoric acid and gypsum, that is $CaSO_4.2H_2O$. The 3-4% of fluorine present in the rock under ordinary circumstances would be evolved because of the temperatures under which the reaction is conducted. However, with the addition of the indicated amount of potassium ion as $K_2O$ in the mixture and the silica already present in the rock, a substantial portion of the fluorine will combine with the potassium and the silica to form potassium silicofluoride. However, it has now been discovered that when this reaction was carried out previously, there was not sufficient silica present to combine with all the fluorine present. Therefore, it is a further feature of the present invention to add an additional amount of silica in the form of silicon dioxide in order to provide sufficient silica for all of the fluorine to combine with potassium and the silica to form potassium silicofluoride, a compound which will precipitate with the gypsum under the conditions of the reaction. The amount of additional silica added should range from about 0.003 to 0.015 parts of $SiO_2$ to 1 part of $P_2O_5$ in the resulting phosphoric acid filtrate. Therefore, as a result of this reaction, there will be formed a solution of phosphoric acid with a precipitate of gypsum in admixture with the potassium silicofluoride formed.

The mixture or slurry resulting from the initial reaction is then separated by use of a filter or other separation device, to provide a solution of phosphoric acid which will contain any excess potassium ion and a solids portion or filter cake comprising the mixture of gypsum and potassium silicofluoride. The potassium silicofluoride may be separated by extraction from the gypsum by the extraction methods disclosed in our copending application Ser. No. 696,289, filed June 15, 1976 now U.S. Pat. No. 4,060,586, issued Nov. 29, 1977.

In a further feature of the invention the phosphoric acid solution may be treated with an additional amount of silica as silicon dioxide in an amount of about 0.1 to 0.5 percent of the total phosphoric acid weight, which will combine with any residual fluorine and the excess potassium to precipitate additional potassium silicofluoride from the phosphoric acid. On removal of the $K_2SiF_6$, the resulting phosphoric acid recovered is a high purity feed grade phosphoric acid.

An additional feature of the present invention is that a greater amount of potassium ion as $K_2O$ may be present in the initial acidulation. This greater amount should be sufficient to react with the phosphoric acid present and form potassium dihydrogen phosphate. In this aspect of the reaction the potassium is preferably present in the form of potassium hydrogen sulfate ($KHSO_4$) or potassium sulfate ($K_2SO_4$), or mixtures thereof, and is added in the stoichiometric amount necessary to combine with the phosphoric acid produced as a result of the reaction. Therefore, at the separation stage the gypsum and potassium silicofluoride will be removed as described above but the resulting solution will be a solution of potassium dihydrogen phosphate contained in phosphoric acid. This latter solution may be treated as described hereinafter for recovery of potassium dihydrogen phosphate and phosphoric acid as desired.

The silica added during the reaction of this invention must be amorphous silicon dioxide in any suitable form so long as it is not deleterious to the reaction under consideration. The silica is preferably obtained from materials combinable with the phosphate rock, such as slag, or commercially available products such as those sold under the tradename "Dicalite", sold by Grafco Corporation.

It has also been discovered in accordance with a further embodiment of this invention that a conventional wet process phosphoric acid facility can be conducted wherein the phosphate rock is acidulated with sulfuric acid under conditions as described above to produce a gypsum precipitate and phosphoric acid. In this system, a portion of the fluorides are evolved in the initial step and are trapped or recovered with a conventional scrubbing system. The precipitated gypsum is then removed from the phosphoric acid and the phosphoric acid is subjected to further treatments to effect defluorination of the phosphoric acid to produce a highly pure feed grade acid. In these further treatments, the phosphoric acid is subjected to defluorination by the addition of silicon dioxide in any of the forms described herein together with the addition of $K_2O$ in order to precipitate additional fluoride from the phosphoric acid as potassium silicofluoride and yield feed grade $H_3PO_4$. The defluorination is effected by precipitation of any fluorides contained in the acid as potassium silicofluoride which can then be removed from the phosphoric acid by means of a separator and treated for recovery of the fluorides as calcium fluoride by the addition of calcium hydroxide so as to produce potassium hydroxide and calcium fluoride.

The resulting pure phosphoric acid may then be recovered or optionally a portion thereof may be treated or reacted with phosphate rock, together with potassium hydrogen sulfate or potassium sulfate, to produce a mixture comprising precipitated gypsum, potassium dihydrogen phosphate, phosphoric acid and fluorides from the phosphate rock as potassium silicofluoride. This mixture may then be separated as desired to remove the precipitated gypsum and $K_2SiF_6$, and recover a fertilizer grade product comprising a mixture of phosphoric acid containing potassium dihydrogen phosphate in solution which may then be recovered or treated as desired such as by granulation. The mixture containing the remainder of the potassium dihydrogen phosphate and phosphoric acid may then be recycled to the defluorination step to provide the $K_2O$ values from the defluorination stage. In an optional embodiment, all or a portion of the gypsum/$K_2SiF_6$ mixture may be recycled to the defluorination stage to provide both silicon dioxide and $K_2O$ values to the defluorination stage.

Referring now to FIG. 1 accompanying the present invention, where a main embodiment of the process is described, it will be seen that reactor or attack vessel 1 is provided and phosphate rock is introduced through line 3 and sulfuric acid is introduced through line 2 to effect the reaction at 75° C., or other desired temperature within the range specified. The attack vessel is preferably maintained under conditions of agitation, and $K_2O$ as potassium ion is introduced through line 4 as indicated. Simultaneously, silicon dioxide-containing slag is introduced through line 5. These components are reacted until substantially complete acidulation is achieved and good gypsum crystal growth is achieved. During the reaction there is no detectable fluoride evolution. The resulting mixture is then transferred by line 6 to filter or other separator 7 where the solid and solution are separated with the solid being removed through line 8 to storage 9. The solid mixture contains the gypsum or calcium sulfate in admixture with potassium silicofluoride and may be separated by extraction as described in our copending application Ser. No. 696,289, filed June 15, 1976 now U.S. Pat. No. 4,060,586, issued Nov. 29, 1977.

The solution from filter 7 comprising a solution of phosphoric acid containing the excess potassium ion as $K_2O$ is removed by line 10 to precipitator or vessel 11 and to the solution in vessel 11 is added additional silicon dioxide through line 12 to effect further precipitation of potassium silicofluoride. About 0.1 to 0.5% of silicon dioxide based on the total amount of phosphoric acid product is added to effect precipitation of the potassium silicofluoride. The resulting mixture is then removed by line 13 to filter 14 where the potassium silicofluoride is removed by line 16 and the resulting solution is recovered at line 15 as highly pure feed grade phosphoric acid.

In an alternative embodiment of FIg. 1, if an excess of $K_2O$ is added to acidulation reactor 1, the resulting phosphoric acid from vessel 11, after removal of the potassium silicofluoride, will contain potassium dihydrogen phosphate in the solution of phosphoric acid and would be recovered at line 15. The excess $K_2O$ in the main acidulation reactor would be provided by the addition of $KHSO_4$, $K_2SO_4$, or mixture through line 4 in a stoichiometric amount to form the $KH_2PO_4$. The potassium dihydrogen phosphate could then be recovered from the phosphoric acid by means known to the art as by concentration of the phosphoric acid solution to effect crystallization of the $KH_2PO_4$ or by extraction of the phosphoric acid from the $KH_2PO_4$ with an organic solvent. Processes for separations of this type are described in U.S. Pat. Nos. 3,697,246 and 3,718,453. In a further optional aspect, the solution of $KH_2PO_4$ in $H_3PO_4$ can be ammoniated by methods known in the art, granulated and marketed as an N-P-K fertilizer.

Figure 2:
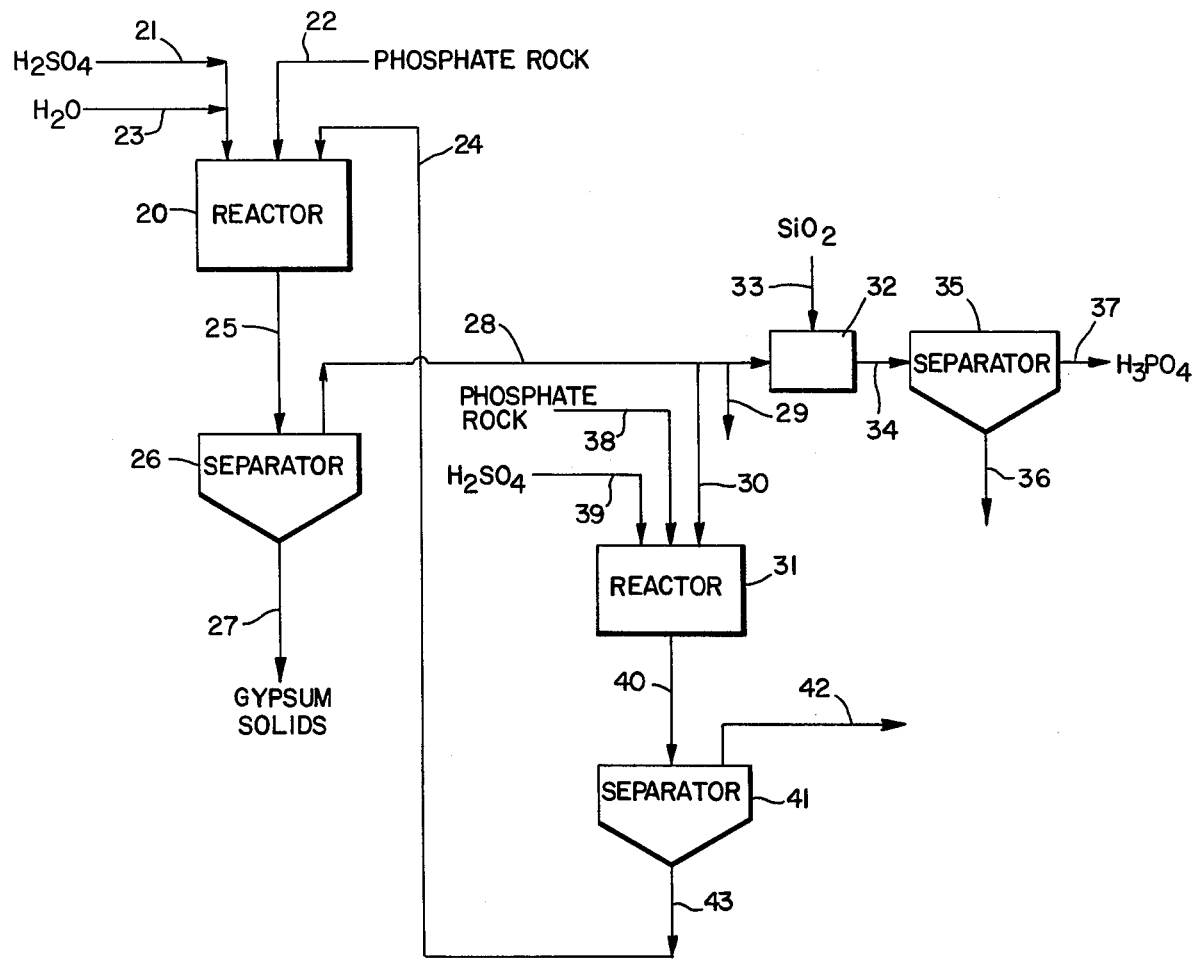
FIG. 2 represents a schematic outline of a continuous method including an optional embodiment for conducting the process of this invention.

In the continuous process of FIG. 2, there is set forth a complete and comprehensive process by which the invention of FIG. 1 can be integrated into an overall acidulation process for the production of phosphoric acid and for conversion of the phosphoric acid and other products to useful fertilizer products. Moreover, the continuous procedure of FIG. 2 also provides means whereby the $K_2O$ and silica necessary to effect the reaction in the acidulation reactor can be provided as part of recycle streams in order to improve the economics of the process.

Referring now more specifically to the process of FIG. 2, it will be seen that reactor 20 is provided as an acidulation reactor in which the phosphate rock is contacted with sulfuric acid in the presence of the $K_2O$ and silica as described for FIG. 1. In main acidulation reactor 20, sulfuric acid is introduced through line 21 and phosphate rock through line 22 with generally continuous agitation in reactor 20, the reactor 20 being maintained at about 75° C. for a sufficient period to achieve good crystal growth. Water of dilution as necessary from line 23 is mixed with the sulfuric acid in line 21 to maintain preferred concentrations. Also additional phosphoric acid from any desired source may be introduced through line 23 to adjust or maintain the $P_2O_5$ concentration in the system within desired limits. The $K_2O$ and $SiO_2$ components are maintained in the reactor 20 in the required amounts from recycle stream 24 as described hereinafter.

After the acidulation reaction is complete in reactor 20, the mixture is removed by line 25 to separator 26 which may be a filter or thickener, and gypsum and other precipitated materials are separated from the phosphoric acid solution and recovered in line 27. The solids recovered from line 27 may be further treated to recover the $K_2SiF_6$ from the gypsum by the methods described in our copending application referred to above.

The phosphoric acid is removed from separator 26 by line 28 and can be completely recovered at line 29, or a portion or all can be passed by line 30 to reactor 31 for reaction with phosphate rock. Preferably about two-thirds by weight of $H_3PO_4$ is removed from the system and one-third is passed to reactor 31.

In an optional but preferred embodiment, the phosphoric acid solution from line 28, including any portion thereof, may be further purified rather than removing by line 29. In this embodiment the phosphoric acid is passed to precipitator 32, maintained at a temperature ranging from about 20° to 60° C. and an amorphous silicon dioxide material added thereto with intimate mixing. The amount of silica material ranges from about 0.1 to about 0.5% of $SiO_2$ based on the total weight of phosphoric acid being treated. The resulting phosphoric acid containing precipitated potassium silicofluoride is then removed by line 34 to separator 35 and the $K_2SiF_6$ is recovered at line 36. The resulting purified feed grade phosphoric acid is removed and recovered at line 37.

In reactor 31, the phosphoric acid portion from line 30 is reacted with phosphate rock from line 38, possibly some sulfuric acid and either potassium bisulfate $(KHSO_4)$ or potassium sulfate from line 39. Reactor 31 is maintained under conditions of agitation at a temperature of about 50° to 90° C. In this reaction, the rock, possibly some sulfuric acid, $KHSO_4$ or $K_2SO_4$, and phosphoric acid react to form $KH_2PO_4$ and gypsum and thereby produce a solution of $KH_2PO_4$ in phosphoric acid containing precipitated gypsum.

The amounts of phosphate rock, sulfuric acid, and $KHSO_4$ and/or $K_2SO_4$ introduced into reactor 31 are added in such amounts as to product a resulting product mixture containing one mol of $KH_2PO_4$ and one mol of $H_3PO_4$ calculated as $P_2O_5$. This reaction slurry is passed by line 40 to separation device 41 which is preferably a settler of known construction from which an overflow and underflow can be recovered. From separator 41, an overflow is continuously removed by line 42, the overflow solution comprising a solution containing substantially equimolar amounts of $KH_2PO_4$ and $H_3PO_4$. The underflow from settler 41 is removed at line 43 and contains a mixture of $KH_2PO_4$, $KHSO_4$ together with precipitated gypsum and other solids including $K_2SiF_6$. This mixture is suitable for recycle to main reactor 20 as it contains $H_3PO_4$, $K_2O$ as $KH_2PO_4$, and $SiO_2$. Thus the mixture is recycled from line 43 to line 24 for introduction into reactor 20. In this embodiment, when utilizing on initial reaction in reactor 20 of 15 moles phosphate rock and 150 mols sulfuric acid, a recycle stream can be provided in line 25 containing 10 mols $KH_2PO_4$, 10 mols phosphoric acid, 30 mols of gypsum and 1 mol $K_2SiF_6$.

Therefore, by the system of FIG. 2, means are provided for effecting the reaction of phosphate rock and sulfuric acid with removal of the fluorides and silica as $K_2SiF_6$ in the gypsum separated from the phosphoric acid and means are also provided for the formation of feed grade phosphoric acid, a solution of $KH_2PO_4$ in $H_3PO_4$, and the recycle of necessary reactants to the acidulation reactors.

The system of FIG. 2 provides a number of advantages in operation of a system of this type. Thus it provides a single separator 26 from which gypsum solids can be recovered so that gypsum and potassium silicofluorides can be removed from the system in a single step and the mixture further treated to recover the $K_2SiF_6$ as described for example in our copending application. Hence both the gypsum and $K_2SiF_6$ are recovered at a single separator. Further phosphoric acid is not required to be made in situ but is recycled from settler 41. Moreover, valuable K and P containing products and pure phosphoric acid are recovered without fluorine pollution problems.

Figure 3:
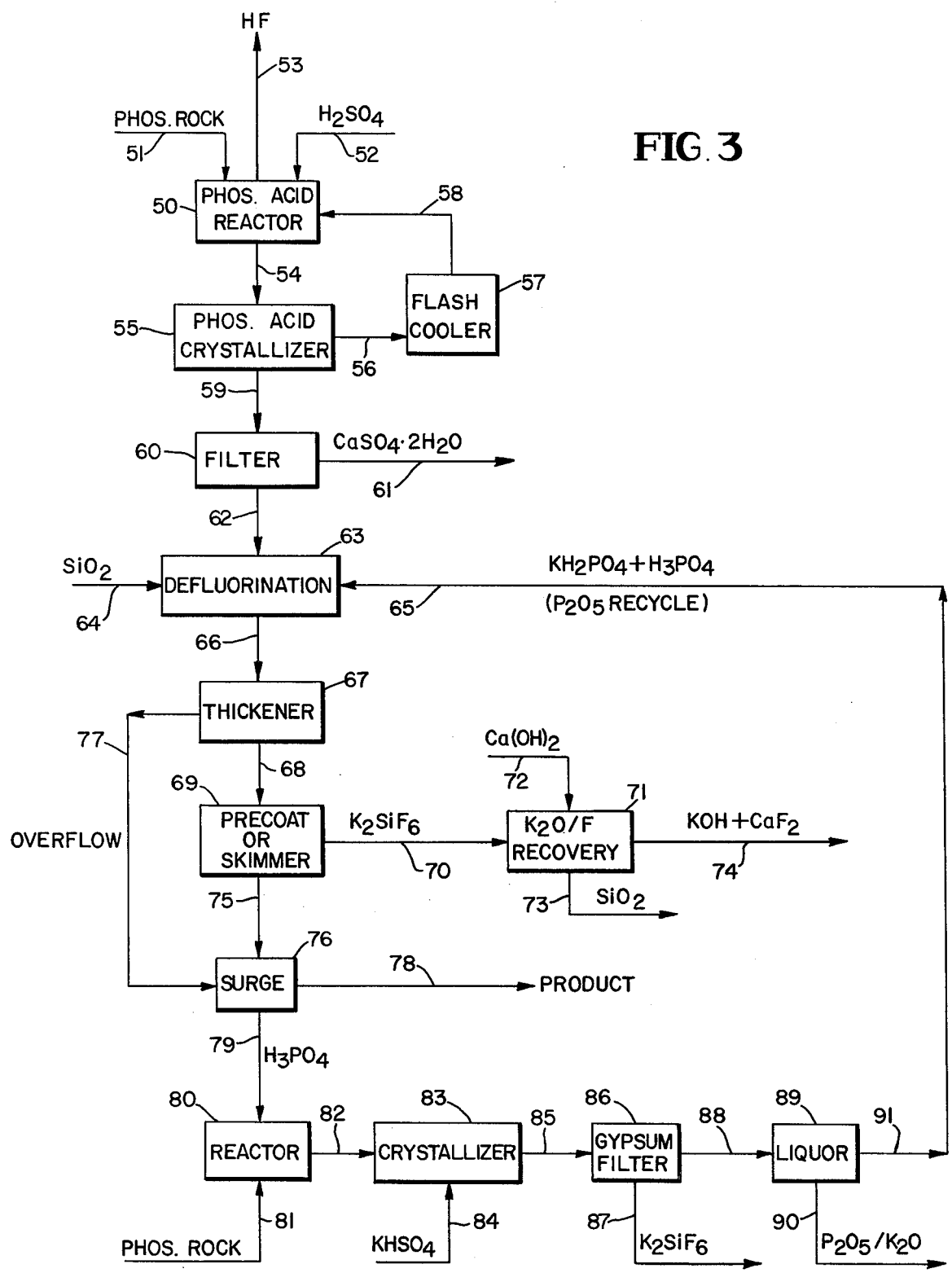
FIG. 3 represents a schematic outline of a continuous method for conducting a conventional wet process phosphoric acid acidulation including embodiments for the recovery of defluorinated phosphoric acid and potassium dihydrogen phosphate products.

Referring now to FIG. 3 accompanying the present invention, which illustrates the embodiment of the present invention wherein wet process phosphoric acid is prepared, it will be seen that a conventional phosphoric acid reactor 50 is maintained for the reaction of phosphate rock introduced at 51 and sulfuric acid introduced at 52. The phosphoric acid reactor is maintained at a temperature of about 50°–90° C. with means provided at 53 for evolution of hydrogen fluoride as a result of the reaction. The hydrogen fluoride from 53 is trapped in a conventional system of scrubbers and traps. During this reaction, the rock and sulfuric acid form a gypsum precipitate in phosphoric acid and this mixture is passed by line 54 to crystallizer 55 maintained at about 20°–40° C. for complete precipitation of the gypsum. A portion of the mixture from crystallizer 55 may be recycled through line 56 to flash cooler 57 and by line 58 to the main reactor in order to maintain the preferred operating conditions in reactor 50.

The resulting slurry from crystallizer 55 is passed by line 59 to filter or other separator 60, preferably a Prayon filter, where a separation is effected between the solid gypsum, which is removed by line 61, and the phosphoric acid filtrate. The filtrate is removed by line 62 to defluorination stage or vessel 63 for conducting the novel treating steps of this embodiment of the invention.

In defluorinator 63, which is maintained at a temperature of about 20°–70° C., silicon dioxide containing materials are introduced through line 64 and simultaneously, a source of $K_2O$, preferably a mixture of potassium dihydrogen phosphate and phosphoric acid as part of a recycle stream, is introduced into defluorinator 63 by line 65 in order to provide sufficient $K_2O$ to precipitate fluorides contained in the phosphoric acid as potassium silicofluoride. The $SiO_2$ and $K_2O$ containing materials may also be any of those materials described above with respect to the main embodiment of FIGS. 1 and 2.

The resulting slurry from defluorination stage 63 is then passed by line 66 to thickener 67 and then by line 68, at least a portion is passed to skimmer or equivalent device 69, which provides for withdrawal of the precipitated potassium silicofluoride by line 70. The potassium silicofluoride in line 70 is passed to recovery tank 71 maintained at a temperature of about 20°–60° C. where it is further treated. Thus recovery tank 71 is provided for the introduction of an aqueous solution of calcium hydroxide from line 72 in sufficient amounts to precipitate the fluorides present as calcium fluoride which will then free the silica to precipitate as silicon dioxide which is removed by line 73. The resulting aqueous solution of potassium hydroxide and calcium fluoride in solution is removed through line 76 for recovery and separation as desired.

The phosphoric acid solution from skimmer 69 is passed by line 75 to surge tank 76 for recovery of a portion if desired. From thickener 67 any overflow phosphoric acid is passed by line 77 directly to surge tank 70. The desired amount of phosphoric acid, preferably about ⅓, may be removed as feed grade phosphoric acid by line 78. The amounts of phosphoric acid removed from the system may be varied as desired. The remainder of the phosphoric acid is passed by line 79 to reactor 80 maintained at a temperature of about 50°–90° C. where it is contacted with phosphate rock from line 81 to form a slurry with some acidulation of the rock caused by the amount of phosphoric acid present. The resulting slurry is then passed by line 82 to crystallizer 83 maintained at a temperature of about 40°–60° C. into which sufficient potassium hydrogen sulfate or potassium sulfate is introduced by line 84 to achieve further reaction in crystallizer 83 and form a resulting mixture of $KH_2PO_4$ in phosphoric acid solution, together with precipitated gypsum which may also contain solid potassium silicofluoride formed by reaction of potassium with the fluoride in the rock. This mixture is then passed by line 85 to gypsum filter 86 wherein the gypsum and potassium silicofluoride are removed by line 87. The resulting solution is passed by line 88 to storage tank 89 from which a portion of the mother liquor product is removed through line 90. This product comprises a mixture of potassium dihydrogen phosphate in phosphoric acid solution containing high analysis values of $P_2O_5/K_2O$, separated from the gypsum and $K_2SiF_6$. A portion of for example up to about ⅓ of the mixture of $KH_2PO_4$ in phosphoric acid, is recycled by line 91 to line 65 for introduction into the defluorination stage 62 to provide the $K_2O$ values for the defluorination step.

Thus by the reaction scheme of FIG. 3, means are provided for conducting a conventional phosphoric acid facility wherein the phosphoric acid product can be further treated to achieve defluorination and for the production of a fertilizer material comprising substantially equal amounts of phosphoric acid and $KH_2PO_4$. Further, means are provided for recovery of the fluorides as usable calcium fluoride.

In an alternative embodiment on the schematic of FIG. 3, the reaction slurry from crystallizer 83 may be passed to a thickener or similar separator rather than a gypsum filter and an overflow removed which will contain a solution of $KH_2PO_4$ in phosphoric acid to provide the $P_2O_5/K_2O$ product desired. The resulting underflow, which will contain $KH_2PO_4$, phosphoric acid, precipitated gypsum and $K_2SiF_6$, is then recycled to the defluorination step and will provide $K_2O$ values as well as $SiO_2$ values, for the defluorination stage.

The following examples are presented to illustrate the invention but it is not to be considered as limited thereto. In the examples and throughout the specification, parts are by weight unless otherwise indicated.

EXAMPLE 1

To demonstrate the embodiment of FIG. 1 and show that the fluorides can be removed from phosphoric acid by the addition of $K_2O$ and $SiO_2$, the following experiments were carried out.

It was discovered that to obtain feed grade phosphoric acid, the weight ratio to $P_2O_5/F$ must be at least 230. Therefore, in the following experiments $KH_2PO_4$ was added to wet phosphoric acid obtained from Conda rock to provide about 1.5 to 2.0 weight percent $K_2O$ in the acid after the $K_2SiF_6$ had precipitated. With a minimum of about 0.7 weight percent soluble $K_2O$ in the acid the fluorine concentration was about 0.25 to 0.30. Increasing the $K_2O$ level as high as 4 to 6 weight percent did not significantly reduce the fluorine level. In addition to the $KH_2PO_4$, different silica bearing materials were added at different concentrations. The samples are equilibrated at 40° C. for about 16 hours and filtered at 40° C., and then the filtrates were analyzed.

The results tabulated in Table I show that with $K_2O$ addition only, the fluorine concentration was about 0.25 weight percent. The following silica materials reduced the fluorine level to 0.15–0.18 percent: Dicalites 425, BA-3, BA-30, SA-3, DPS-20, SA-33, Superaid, and slag from Duval's Ferro-Moly plant. These several "Dicalite" products comprise a series of silica-containing products sold under that trademark by Grafco Corporation. The slag was obtained from the Ferro-Moly plant of Duval Corporation. Even at an F concentration of 0.15–0.18 the $P_2O_5/F$ weight ratio was only about 175 which is not high enough for feed grade acid. This F concentration corresponds closely to the $K_2SiF_6$ solubility in $H_3PO_4$ at 20–30% $P_2O_5$.

According to the $K_2SiF_6$ solubility in $H_3PO_4$ curves, the $P_2O_5/F$ weight ratio can be increased by concentrating the acid to 50–60% $P_2O_5$. A number of tests were run during which different samples were concentrated to 50–60% $P_2O_5$. It was found that there could be obtained $P_2O_5/F$ weight ratios higher than 230 by adding $KH_2PO_4$ and additional silica bearing materials to wet phosphoric acid and then concentrating.

TABLE I
ADDITION OF KH$_2$PO$_4$ AND SILICA-BEARING MATERIALS TO WET ACID

Samples equilibrated at 40° C. for about 16 hours.
For each sample 93.5 gms of wet acid
and 6.5 gms of KH$_2$PO$_4$ were used.
Composition of Wet Acid: K$_2$O—0.04%; SiO$_2$—0.99%;
F—1.11%; P$_2$O$_5$—28.5%.

| Ex. No. | Silica Material Added | Gms Material Added | Resulting Filtrate Analysis (Wt. %) | | | |
|---|---|---|---|---|---|---|
| | | | K$_2$O | SiO$_2$ | F | P$_2$O$_5$/F |
| 1 | Dicalite 425[1] | 0.0 | 1.77 | 0.0 | 0.25 | 123 |
| 2 | Dicalite 425 | 0.1 | 1.68 | 0.02 | 0.20 | 148 |
| 3 | Dicalite 425 | 0.5 | 1.46 | 0.02 | 0.19 | 150 |
| 4 | Dicalite 425 | 1.0 | 1.80 | 0.02 | 0.18 | 170 |
| 5 | Dicalite Superaid | 0.0 | 1.71 | 0.0 | 0.24 | 125 |
| 6 | Dicalite Superaid | 0.1 | 1.76 | 0.0 | 0.24 | 125 |
| 7 | Dicalite Superaid | 0.5 | 1.76 | 0.0 | 0.18 | 165 |
| 8 | Dicalite Superaid | 1.0 | 2.02 | 0.0 | 0.15 | 226 |
| 9 | Dicalite BA-3 | 0.1 | 1.69 | 0.02 | 0.16 | 185 |
| 10 | Dicalite BA-3 | 0.5 | 1.70 | 0.02 | 0.17 | 168 |
| 11 | Dicalite BA-3 | 1.0 | 1.82 | 0.02 | 0.16 | 190 |
| 12 | Dicalite BA-30 | 1.0 | 1.74 | 0.02 | 0.15 | 200 |
| 13 | Dicalite SA-3 | 1.0 | 2.01 | 0.02 | 0.17 | 177 |
| 14 | Dicalite DPS-20 | 1.0 | 1.74 | 0.02 | 0.17 | 177 |
| 15 | Dicalite SA-33 | 1.0 | 1.81 | 0.02 | 0.18 | 167 |
| 16 | Duval Slag[2] | 0.0 | 1.73 | 0.02 | 0.20 | 152 |
| 17 | Duval Slag | 0.1 | 1.75 | 0.02 | 0.17 | 173 |
| 18 | Duval Slag | 0.5 | 1.71 | 0.02 | 0.17 | 170 |
| 19 | Duval Slag | 0.1 | 1.65 | 0.02 | 0.17 | 173 |

[1]Dicalite- silica product sold by Grafco Corporation
[2]Duval Slag- obtained from Duval Corporation

EXAMPLE 2

In this example the reaction was conducted according to the flow sheet of FIG. 2.

Into the main reactor was introduced 15 mols of phosphate rock and 150 mols of sulfuric acid and the acidulation reaction was conducted a 75° C. with agitation. A recycle stream provided 10 mols KH$_2$PO$_4$, 10 mols phosphoric acid, 20 mols gypsum and 1 mol K$_2$SiF$_6$ and a second stream provided phosphoric acid containing 43 mols P$_2$O$_5$. Phosphoric acid was obtained from the first settler and ⅔ was recovered. The other ⅓ of the phosphoric acid was reacted at stoichiometric ratios with phosphate rock and KHSO$_4$ at a 30% solids concentration to produce potassium dihydrogen phosphate and ⅓ of the KH$_2$PO$_4$ in H$_3$PO$_4$ solution was recovered from the settler. The other ⅔ of the KH$_2$PO$_4$ together with the H$_3$PO$_4$, gypsum and other precipitated material, were recycled to provide the recycle stream to the main acidulation reactor.

EXAMPLE 3

In this example the reaction was conducted according to the embodiment of FIG. 3.

Into the main reactor was introduced phosphate rock at a rate of 45 mols/hour of P$_2$O$_5$ for reaction with sulfuric acid introduced at a rate of 150 mols/hour for reaction at 75° C. The reactor was provided with agitation and the temperature was maintained by recycle of a portion of the reacting mixture through a flash cooler. Evolved fluorides were trapped in a conventional water scrubber system. The resulting slurry was passed to a Prayon filter from which 150 mols/hour of calcium sulfate were removed in the continuous procedure. The resulting phosphoric acid solution was thenpassed to a defluorination stage where it was reacted at a temperature of about 60° C. with silicon dioxide and a recycle stream providing 10 mols of P$_2$O$_5$ and 10 mols of K$_2$O. Sufficient SiO$_2$ was introduced as Dicalite to react with the fluorine present in the H$_3$PO$_4$ as determined by analysis of the H$_3$PO$_4$. A portion of the reacted mixture containing precipitated fluorides as K$_2$SiF$_6$, is then passed to a thickener and underflow from the thickener is passed to a skimmer from which 5 mols of K$_2$SiF$_6$ are removed as a precipitate from the system. The K$_2$SiF$_6$ is then reacted with 15 mols calcium hydroxide at 60° C. Under these conditions, a silicon dioxide precipitate forms and is removed from the system to provide a solution containing 10 mols KOH and 15 mols CaF$_2$.

The resulting solution from the skimmer of phosphoric acid, together with overflow H$_3$PO$_4$ from the thickener, are passed to a surge tank from which a phosphoric acid solution containing 36 mols P$_2$O$_5$ and a N-P-K value of 0-30-0.3 is removed from the system as feed grade phosphoric acid.

The remaining H$_3$PO$_4$ from the surge tank, containing 19 mols P$_2$O$_5$ is passed to a reactor maintained at 75° C. and reacted with phosphate rock containing 9 mols P$_2$O$_5$. The resulting slurry is then passed to a crystallizer maintained at 50° C. into which is introduced 30 mols KHSO$_4$ containing 15 mols K$_2$O. The resulting slurry is then filtered to remove and recover a gypsum solids mixtures containing 30 mols of gypsum and 1 mol of K$_2$SiF$_6$. The resulting filtrate solution, which now has an N-P-K value of 0-24-8, is then separated and a mixture removed from the system which contains 18 mols of P$_2$O$_5$ and 9 mols K$_2$O and contains these materials substantially as KH$_2$PO$_4$ and H$_3$PO$_4$. This product may be granulated for use as a fertilizer or otherwise treated as desired. The mixture not removed from the system is recycled to the defluorination step for reaction with phosphoric acid and silicon dioxide to provide 10 mols P$_2$O$_5$ recycle.

EXAMPLE 4

Example 3 was repeated except that the phosphoric acid solution, after reaction with phosphate rock and KHSO$_4$ in the crystallizer, was passed to a thickener where an overflow was continuously removed containing 18 mols of P$_2$O$_5$ and 9 mols K$_2$O and this mixture, having an N-P-K value of 0-24-8 is removed from the system for further treatment as desired such as granulation. The resulting underflow from the thickener containing 10 mols KH$_2$PO$_4$, 10 mols phosphoric acid, 30 mols gypsum and 1 mol potassium silicofluoride, is recycled to the defluorination stage to provide K$_2$O and SiO$_2$ values to the defluorination.

The invention has been described herein with reference to certain preferred embodiments. However, as obvious variations thereon will become apparent to those skilled in the art, the invention is not to be considered as limited thereto.

What is claimed is:

1. A continuous method for the preparation of phosphoric acid and a solution of KH$_2$PO$_4$ in phosphoric acid in the substantial absence of fluorine evolution, by the steps which comprise:
   (a) reacting in a first acidulation reactor, a fluorine-containing phosphate rock with sufficient sulfuric acid to effect acidulation of the rock, said reaction being conducted in the presence of:
   (1) potassium ion provided by addition of a member selected from the group consisting of KH$_2$PO$_4$, KHSO$_4$, K$_2$SO$_4$, KOH and mixtures thereof in sufficient amounts to combine with the fluorine liberated from the phosphate rock during acidulation and in a sufficient excess amount that the phosphoric acid recovered from the reaction will contain about 0.5 to 1.0 weight percent potassium ion as $K_2O$; and (2) in the presence of a sufficient amount of silicon dioxide to combine with the fluorine liberated during acidulation of the rock and a sufficient excess amount of the silicon dioxide to provide about 0.003 to 0.015 parts of silicon dioxide per part of $P_2O_5$ in the phosphoric acid recovered, said reaction being continued until acidulation of the phosphate rock is substantially complete and adequate gypsum crystal growth is achieved;

(b) forming a resulting mixture of precipitated gypsum and other solids including $K_2SiF_6$ in phosphoric acid and removing the mixture from the acidulation reactor;

(c) separating the precipitate from the phosphoric acid solution;

(d) dividing the phosphoric acid solution into two portions and recovering one portion of phosphoric acid;

(e) reacting in a second acidulation reactor the other portion of phosphoric acid solution with phosphate rock and a member selected from the group consisting of $KHSO_4$, $K_2SO_4$ and mixtures thereof, to produce a solution of $KH_2PO_4$ in $H_3PO_4$ containing precipitated gypsum and other solids including $K_2SiF_6$; and (f) separating the precipitated gypsum and other solids from the solution and recycling the solution to the first acidulation reactor so as to provide potassium ion, silicon dioxide and phosphoric acid thereto.

2. A method according to claim 1 wherein both acidulation reactions are conducted at a temperature of about 50° to 90° C.

3. A method according to claim 1 wherein at least a portion of the potassium ion in the first acidulation reactor is provided by the addition of $KH_2PO_4$.

4. A method according to claim 1 wherein the first acidulation reaction is conducted at a temperature of 60° to 75° C.

5. A method according to claim 1 wherein at least a portion of the silicon dioxide is provided by the addition of an amorphous silicon dioxide.

6. A method according to claim 1 comprising the further steps of contacting the portion of phosphoric acid recovered from step (d) with 0.1 to 0.5% of silicon dioxide based on the total weight of phosphoric acid solution to precipitate additional $K_2SiF_6$, and recovering a feed grade phosphoric acid.

7. A method according to claim 1 wherein said other portion of phosphoric acid is additionally mixed with sulfuric acid in said second acidulation reactor.

* * * * *